Patented Apr. 4, 1933

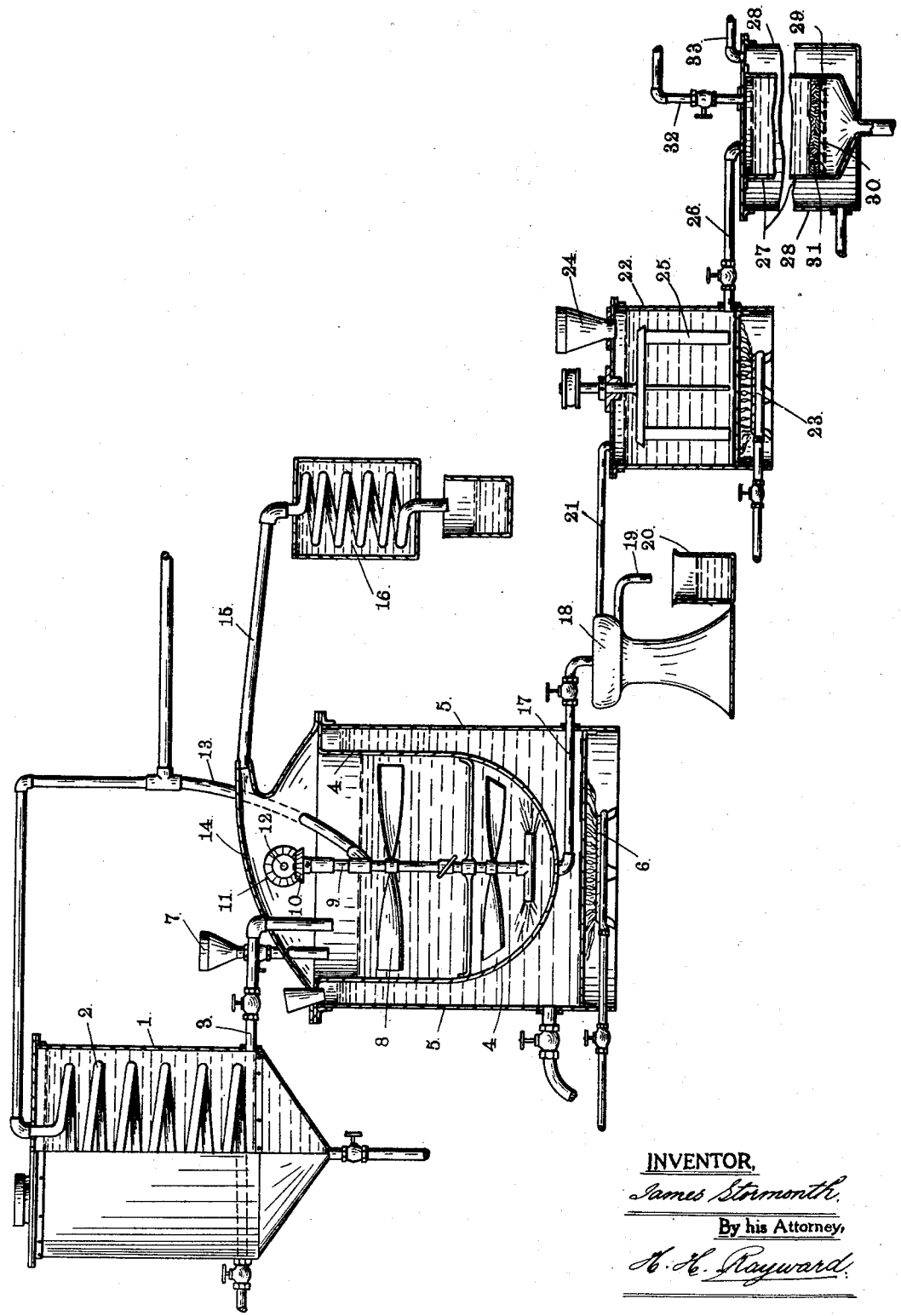

1,903,370

UNITED STATES PATENT OFFICE

JAMES STORMONTH, OF EPPING, NEW SOUTH WALES, AUSTRALIA

PROCESS FOR RECLAIMING OILS

Application filed September 14, 1932, Serial No. 633,119, and in Australia August 12, 1931.

My invention provides means whereby engine, crank case, transformer and other oils, which have deteriorated from use, are rejuvenated, and their original characteristics, including their chemical, and physical qualities and color, are restored.

Deleterious matter commonly found in used oils, such as organic, inorganic, oxidized, hard and soft asphaltic, and resinous substances, water, acids and diluents are by my invention entirely removed.

The essential feature of my invention consists in the employment of a fluid re-agent which is brought into association with the mineral oil to be rejuvenated but will not blend therewith except at relatively high temperatures approximating that to which it is subjected as hereinafter described and which separates from the oil when the temperature falls. The re-agent causes precipitation of some of the deleterious content of the oil and combines with others thereof, the precipitate and the combined matters being carried away with the re-agent when it is separated from the oil under treatment.

Castor oil is the re-agent best suited to my process. It is possible to use a blown oil, but such substitution is not altogether satisfactory because at the end of the process the reclaimed oil will be found to contain a small proportion of the blown oil re-agent and special means must be employed for its removal.

I will now describe my process in detail and also the apparatus which I have devised for employment therewith, reference being made to a diagrammatic elevation shown on the accompanying drawing.

It must however be understood that the drawing is not intended to limit the invention to the precise details of form illustrated, because, as will be well understood by industrial chemists, the individual successive steps in the process may be carried out in any of several forms of apparatus each capable of producing the effect desired at that stage of the process.

According hereto the oil to be reclaimed is run into a settling tank 1 where such impurities, including water, as will settle out by gravitation are removed through a valve at the bottom of the tank. The precipitation of the impurities may be facilitated by heating the oil by means of a steam coil 2.

After this preliminary separation has been effected the oil is delivered through a pipe 3 to a vessel 4 arranged within a jacket 5 containing oil which may be heated by a burner 6.

The oil under treatment is then mixed with a re-agent formed by saturating castor oil (which may be of second quality) while at a temperature of approximately 160° F. with a mineral oil with which it will blend, for instance a heavy red or pale mineral oil of high specific gravity.

The quantity required of the re-agent will be about ten per cent by volume of the quantity of oil under treatment and it is passed into vessel 4 through a funnel 7, and is thoroughly mixed with the oil by agitating blades 8 upon a spindle 9 which is rotated by a bevel wheel 10 fixed upon it which is enmeshed a wheel 11 upon a driven shaft 12.

The oil in jacket 5 is then heated by burner 6 to such temperature that the oil and re-agent in vessel 4 are heated to a temperature preferably about 250° F. which will prevent condensation of super-heated steam which is about to be used.

The mixture is then subjected to the action of a jet of super-heated steam conveyed through a pipe 13 at a temperature of about 600° F. for sufficient time for all the content of heavy ends of fuel to pass off with the freed steam the oil being by the removal of these relatively lighter hydrocarbons brought back to its original flash point and viscosity.

Vessel 4 is covered by a hood 14 and the vapors with the steam are conveyed therefrom through a pipe 15 to a condenser 16 the distillate so collected being available for power or other purposes.

When the above stage in the process has been completed, which may be ascertained by taking the flash point of the oil under treatment and it is found to be equal to that of the oil being treated when it was new the mixture of oil and re-agent may be passed into another vessel wherein it is cooled or, may be allowed to remain in vessel 4 and the hot oil in jacket 5 substituted by cold oil or other cooling medium.

In either case the mixture is cooled down to a temperature between 90° F. and 100° F. while being continuously stirred by the agitators.

At this stage, and after the super-heated steam has been shut off, a small proportion, about three per cent, of trimethanolamine, or other chemical having similar effect or similar emulsifying properties, may be added through funnel 7 to the mixture for the purpose of assisting the subsequent separation of the oil from the castor oil re-agent.

The mixture is then conveyed by a pipe 17 to a centrifugal machine 18 which completely separates the oil from the re-agents, the separation being best effected while the temperature of the mixture is not above 70° F.

It will be understood that in the centrifuging operation, a small quantity of the castor oil re-agent should be put into the centrifugal machine to act as a seal.

The re-agent and deleterious matters are delivered through a pipe 19 to a receptacle 20 while the treated oil is delivered through a pipe 21 to a mixing vessel 22 wherein it is heated, by a burner 23, to a temperature of about, and not exceeding, 260° F.

The castor oil re-agent actually blends with the oil under treatment at the temperature indicated herein, and whilst in the blended state precipitates a quantity of the oxidized matter taking the remainder into solution. When a critical temperature (which may vary slightly with the quality of oil) is reached in the cooling down of the oil, the re-agent separates out from the oil and carries down with it by gravitation not only the organic and inorganic suspended impurities but the precipitated products of oxidation, and, also those with which it is combined in solution, thereby leaving the oil entirely free from oxidized products. Whilst this separation would take place by gravitation it is preferable to use mechanical means as herein described, because saving of time is thereby effected.

Fuller's earth or other decolorizing material is then slowly passed in, from a hopper 24 and thoroughly stirred by the arms 25 which are revolved by any convenient means.

The stirring in of fuller's earth may take approximately one hour to complete. Care must be exercised not to unduly hasten this operation or frothing may occur.

The oil, without being allowed to settle, is then run through a pipe 26 into a pressure filter chamber 27 which has a steam jacket 28, and contains at the bottom a filtering pad 29 composed of asbestos, paper pulp, or other medium, supported upon strong metal gauze 30 and having spread upon its upper surface a layer 31 of fuller's earth.

Air is then forced into filter chamber 27 through a pipe 32 until a pressure of about sixty pounds per square inch is attained therein, while steam is passed into the jacket through a pipe 33 to produce a minimum temperature within the chamber of 212° F.

The reclaimed oil having been forced through the filter may be subjected to further filtration in a similar filter and/or may be blown with hot air to brighten it, or may be bleached by any usual method.

The re-agent may be reclaimed for further use by the following means:—

The sludge which is recovered from the centrifugal separation and which contains both suspended and dissolved impurities is diluted with industrial alcohol to a suitable degree and is either filtered or centrifuged or both.

The dissolved impurities, such as asphaltic and oxidized matter, are then precipitated by petroleum spirit or other suitable precipitant and further filtered or centrifuged or both.

The trimethanolamine may be recovered by extraction with water and subsequent concentration.

The solvents or precipitants may then be removed by distillation.

I claim:—

1. A process for rejuvenating used mineral lubricating oil, comprising the following steps: heating the oil and removing a part of the impurities therefrom by gravitational settling out; mixing the oil with a fluid re-agent comprising castor oil blended with about 10% of mineral oil of high specific gravity at a temperature of about 160° F. with which it will not blend except at high temperature; heating the resultant mixture and subjecting it to super-heated steam while being stirred to drive off diluent material of no lubricating value; cooling the mixture to about 70° F., separating the oil from the re-agent and deleterious matters by centrifuging; adding decolorizing material; and passing the resultant mixture through a straining medium to thereby clarify the oil.

2. A process for rejuvenating used mineral lubricating oil comprising the following steps: heating the oil and removing a part of the impurities therefrom by gravitational settling out; mixing the oil with a fluid re-agent comprising castor oil blended with about 10% of mineral oil of high specific gravity at a temperature of about 160° F. with which it will not blend except at high temperature; heating the resultant mixture and subjecting it to super-heated steam while being stirred to drive off diluent material of no lubricating value; adding about 3% of an element of the trimethanolamine type for the purpose of assisting subsequent separation of the oil from the re-agent; cooling the mixture to about 70° F., separating the oil from the re-agent and deleterious matters by centrifuging; adding decolorizing material; and passing the resultant mixture through a straining medium to thereby clarify the oil.

3. In a process for reclaiming mineral lubricating oil, the step which includes the employment of a re-agent, comprising castor oil blended with about 10% of mineral oil of high specific gravity at a temperature of about 160° F. which will not blend with the oil to be treated except at high temperature, but which, when mixed with the oil and heated above boiling point of water or about 250° F., will effect precipitation of part of the deleterious contents thereof, and will combine with others whereby the precipitated matter may be withdrawn and the combined matter will be removed with the re-agent when it is separated from the oil.

4. In a process for reclaiming mineral lubricating oil, the step which includes the employment of a re-agent, comprising castor oil blended with about 10% of mineral oil of high specific gravity at a temperature of about 160° F. which will not blend with the oil to be treated except at high temperature, but which, when mixed with the oil and heated above boiling point of water or about 250° F., will effect precipitation of part of the deleterious contents thereof, and will combine with others whereby the precipitated matter may be withdrawn and the combined matter will be removed with the re-agent when it is separated from the oil and subjecting the mixture to the action of super-heating steam; the quantity of re-agent required being about 10% by volume of the quantity of oil under treatment.

In testimony whereof I have signed my name to this specification.

JAMES STORMONTH.